July 10, 1956 M. W. SCHELDORF 2,754,514

BROAD BAND ANTENNA

Filed Sept. 30, 1952 6 Sheets-Sheet 1

INVENTOR.

Marvel W. Scheldorf

BY Alois W. Graf

Atty.

INVENTOR.
Marvel W. Scheldorf
BY Alois W. Graf
Att'y.

INVENTOR.
Marvel W. Scheldorf
BY
Alois W. Graf
Att'y.

July 10, 1956 M. W. SCHELDORF 2,754,514

BROAD BAND ANTENNA

Filed Sept. 30, 1952 6 Sheets-Sheet 4

INVENTOR.
Marvel W. Scheldorf
BY
Alois W. Graf
Att'y.

July 10, 1956 M. W. SCHELDORF 2,754,514

BROAD BAND ANTENNA

Filed Sept. 30, 1952 6 Sheets-Sheet 5

INVENTOR.
Marvel W. Scheldorf
BY
Alois W. Graf
Att'y.

July 10, 1956 M. W. SCHELDORF 2,754,514

BROAD BAND ANTENNA

Filed Sept. 30, 1952 6 Sheets-Sheet 6

INVENTOR.
Marvel W. Scheldorf
BY
Alois W. Graf
Att'y.

United States Patent Office 2,754,514

Patented July 10, 1956

2,754,514

BROAD BAND ANTENNA

Marvel W. Scheldorf, Palos Heights, Ill., assignor to Andrew Corporation, a corporation of Illinois Application September 30, 1952, Serial No. 312,235

8 Claims. (Cl. 343—769)

The present invention relates to a broad band antenna, and more particularly to an improved antenna element suitable for use with or without a reflector.

For certain purposes it is desirable to provide an antenna having broad band radiation characteristics. Attempts have been made to use a combination of elements to provide such broad band operating characteristics, but not infrequently it has been found that there is an impedance limitation in the primary radiator or feed line. It furthermore has been common experience to find an antenna element of large cross section while having perhaps the desired radiation characteristics presents a problem of connection between the end of the transmission feed line and the antenna radiating element. Not infrequently the transformation of impedances is not satisfactory and a distortion of the desirable qualities of the radiating element occur.

In accordance with the present invention many of the difficulties encountered in previous attempts to obtain an antenna element for broad band operation have been obviated by an element which has a generally cylindrical configuration having an unusually large diameter to length ratio. This element is so constructed as to have a physically small space between the parts at which the transmission line is to be connected. The length of the cylindrical structure is substantially the same as the circumference thus providing the unsual diameter to length ratio.

It is, therefore, an object of the present invention to provide an improved antenna having broad band transmission characteristics.

A further object of the invention is to provide an improved antenna element having a relatively large cross section.

Still another object of the invention is to provide an improved antenna element of large cross section and a power feed therefor without burdensome transformation of impedances between the transmission line and the antenna element.

A still further object of the invention is to provide an antenna of broad band transmission characteristics which has a smooth transmission coaxial feed line to the radiating element.

Other and further objects of the present invention subsequently will become apparent by reference to the following description taken in conjunction with the accompanying drawings wherein.

Figure 1:
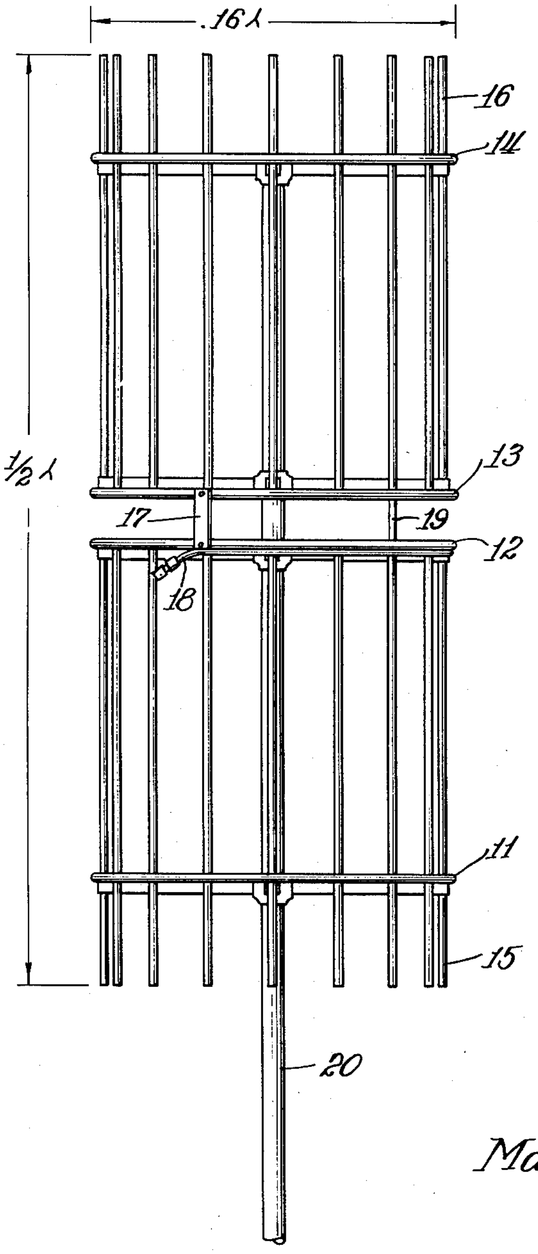
Figure 1 is a side view of the radiating element.
Figure 2:
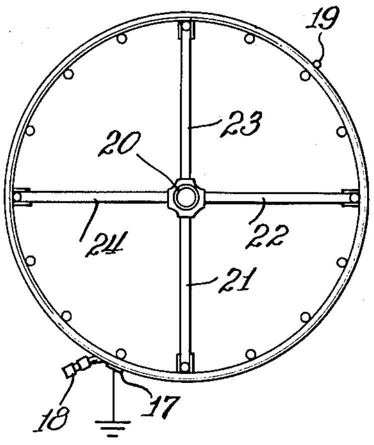
Figure 2 is an end view of the radiating element shown in Figure 1.
Figure 3:
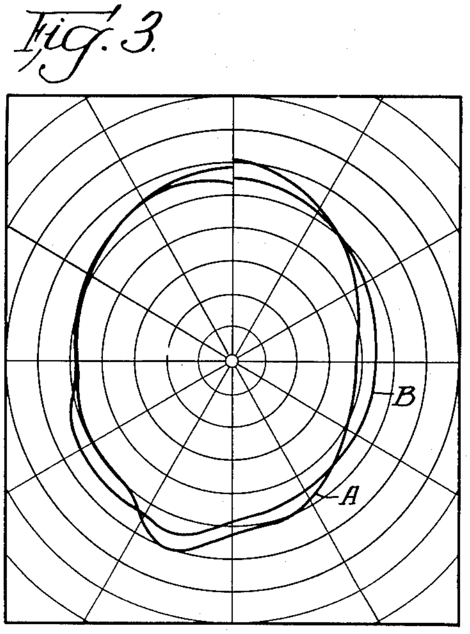
Figures 3, 4, 5 and 6 are graphical representations of the relative power radiated in the H plane at various frequencies.
Figure 4:
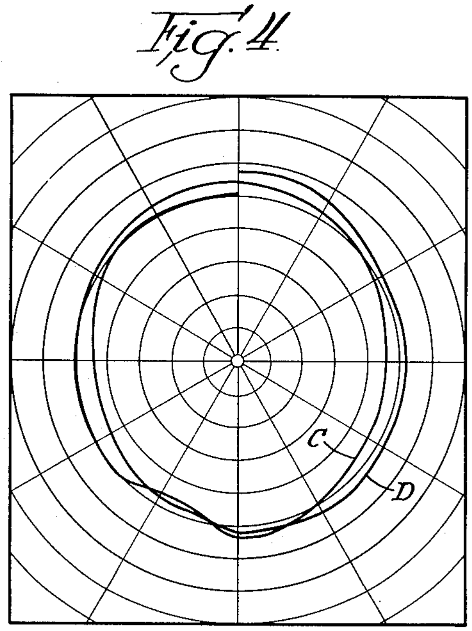
Figure 5:
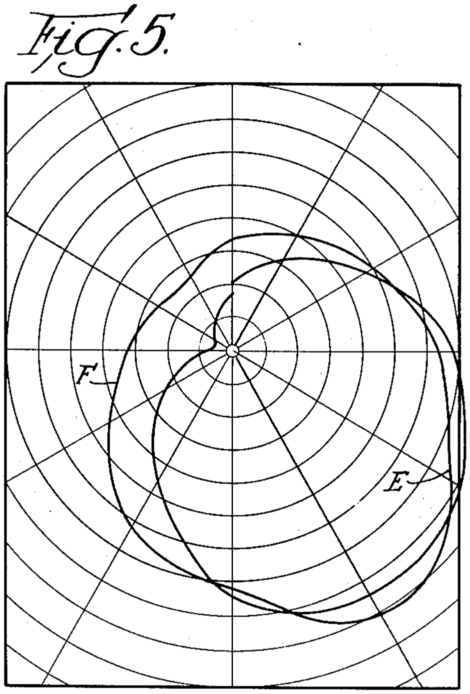
Figures 24, 25, 26, 27, 28, 29, 30:
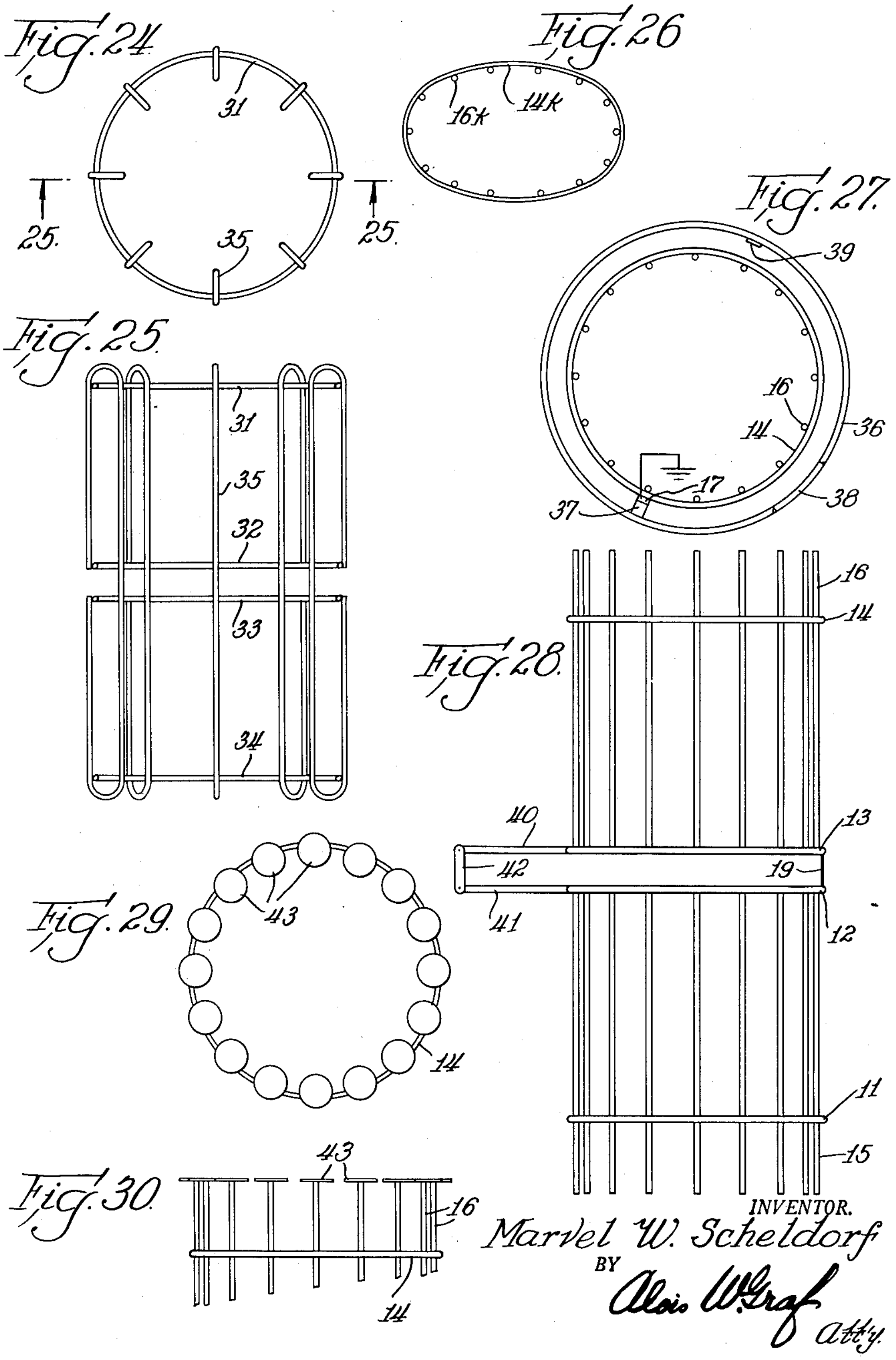

Figures 15 to 23 diagrammatically show different variations of the structure illustrated in Figures 1 and 2;

Figures 24 and 25 are end and side views respectively showing another embodiment of the invention;

Figure 26 is an end view of a variation of the structure shown in Figure 1;

Figure 27 is an end view of another variation of the structure shown in Figure 1;

Figure 28 is a side view of still another variation of the invention; and

Figures 29 and 30 are an end view and a partial side view respectively of a still further modification of the structure shown in Figures 1 and 2.

Referring to Figures 1 and 2 of the drawing there is shown a radiating element which defines generally a cylindrical structure. This cylindrical structure may have a length equal to one-half wave length at a selected frequency. In that case a diameter is approximately .16 wave lengths or the circumference is substantially one-half wave length.

To define the cylindrical configuration it has been found sufficient to employ a plurality of rods 15 with the rod's ends aligned with the ring 12. In a specific arrangement the ring 11 is located at three-fourths of the distance from the ring 12 along the length of the rods 15.

The rings 13 and 14 support a similar member of rods 16 in an arrangement corresponding to the arrangement of the rings 11 and 12 and the rods 15. In the particular construction illustrated the cylindrical surface is adequately defined by the use of sixteen rods on each half of the cylinder. A short circuit connection 17 which is grounded is provided between the rings 12 and 13. A coaxial transmission line conductor 18 extends adjacent the ring 12 and forms a feed point on the opposite side of the short circuit grounded connection 17 at the position 19. The feed is produced by fastening the outer conductor to one ring 12 and the inner conductor extended out to connect with the other ring 13. In the particular arrangement shown the feed point is displaced 15° away from the point diametrically opposite the short circuit element 17.

The particular construction is mounted on a central insulated support element or rod 20 having suitable radial insulated support members 21, 22, 23 and 24. To further illustrate the construction reference is herewith made to the dimensions of a particular embodiment. The various rings 11, 12, 13 and 14 were constructed of tubing of seven-eighths inch diameter and having a circle diameter of thirty-three inches. Sixteen rods such as 15 and 16 for each half of the cylindrical configuration were employed, the rods each being five-eights of an inch in diameter and forty inches long. The rods 11 and 14, therefore, were located ten inches from the outer extremities of the rods 15 and 16 respectively. The two rings 12 and 13 were spaced four inches apart. A 3 mmf. capacitor was connected across the input terminal 19. A satisfactory impedance relationship was obtained between the transmission line and the radiating element without the use of any matching transformer.

The graphical representations in Figures 3, 4, 5 and 6 show the relative power of the radiation patterns as given by curves A, B, C, D, E, F and G for frequencies of 49, 57, 65, 73, 81, 89 and 97 megacycles respectively. These are the H plane patterns obtained with the unsymmetrical feed for the cylindrical radiating element.

The curves H, I, J, K, L, M and N of Figures 7, 8, 9 and 10 are the patterns obtained in the E plane as seen perpendicular to the plane of the short circuit connection 17 of Figure 1, at the same frequencies 49, 57, 65, 73, 81, 89 and 97 megacycles respectively. The curves O, P, Q, R, S, T and U are for the same frequencies respectively as seen in the plane of the short circuit connection.

It will be noted that in the H plane patterns there is a transition toward a traveling wave antenna pattern in a direction directly away from the feed terminals 19. While the theory for obtaining the desirable characteristics in a structure of this kind has not been developed it would appear that if the distance from the short circuit member 17 to the feed terminals 19 becomes appreciable in terms of the wave length of the energy being radiated, the antenna element operates both as a standing wave radiator and a traveling wave radiator. Because of the displacement between the short circuit element 17 and the feed terminals 19 from the diametrically opposite points there is a difference in loading around the peripheries of the rings 12 and 13 in opposite directions from the feed terminals 19. Hence the longer periphery has a greater loading, and hence a great deal more of the relative traveling wave components. This is believed to produce the bending of the radiation pattern to a greater extent than the measured angle between the terminals 19 and the point diametrically opposite the short circuit element 17. It, of course, is to be appreciated that while the foregoing explanation has been given in an attempt to describe the invention and to facilitate the understanding thereof by those skilled in the art, the explanation is to be without prejudice to the invention or to the inventor since subsequent research and explorations may provide a basis for a modification or different analysis.

In order to teach the present invention, thus far a particular embodiment has been illustrated and described. It will be understood that numerous variations are contemplated. While for a particular band of frequencies to be radiated it was found advantageous to connect the feed line a short distance from the center of the longitudinal slot, other operating conditions might be made to better advantage by connecting the feed line at the longitudinal center of the slot or at a plurality of points along the slot.

Figure 15:
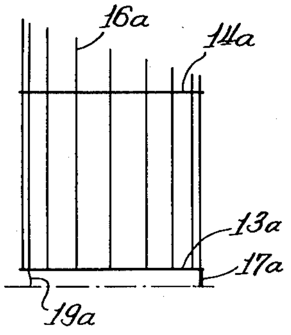

Some of the variations contemplated are shown in Figures 15 to 30 of the drawings. Figure 15 is a diagrammatic representation of one-half of the structure shown at Figure 1. The variation contemplated is a change in the lengths of the rods 16 of Figure 1 which may increase in length from a point at the connector bar 17 or termination in a somewhat linear manner. Accordingly this variation has been given reference characters such as **13*a*, 14*a***, etc. to indicate a comparable structure having somewhat different dimensions than those suggested by the construction illustrated in Figure 1.

Figure 16:
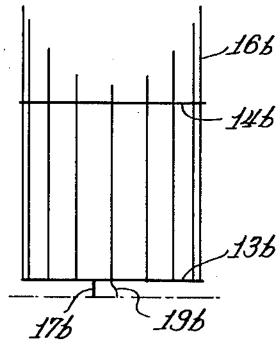
Figure 17:
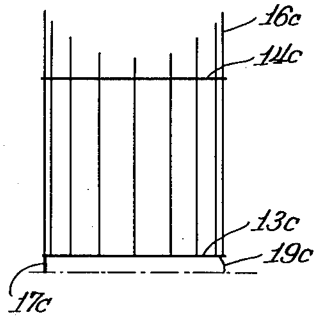
Figure 18:
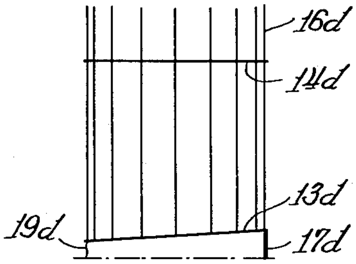

Still another variation is illustrated in Figure 16 wherein the rods **16*b* vary in a logarithmic manner so that the shortest rod 16*b* is in alignment with the feed point or with the termination 17*b*. For certain operating conditions the length of the rods 16*c* may vary as indicated in Figure 17 where the longest rods are in the vicinity of the termination 17*c* and the feed points 19*c***.

In the arrangement illustrated in Figure 1 the two circular members 12 and 13 were separated by equal distances so that the two circular members were in parallel planes. This provided a uniform slot. By positioning the rings 12 and 13 as indicated by the ring **13*d* in Figure 18 the slot might be tapered. The taper may run from the feed line 19*d* so as to increase to the termination 17*d* or vice versa. From the illustration of this variation in Figure 18 it also will be appreciated that the configuration of the slot between the two rings corresponding to 12 and 13** of Figure 1 might have some other shape.

Figure 19:
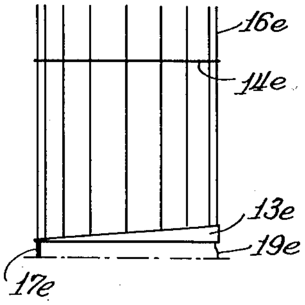

Still another variation is illustrated in Figure 19 wherein the ring **13*e* and the complementary ring 12*e* may have a tapered configuration. Thus the cross section of ring 13*e*** need not be uniform as might be assumed from the embodiment shown in Figure 1.

Figure 20:
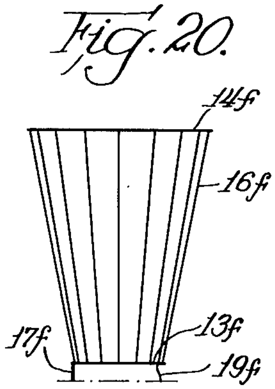
Figure 21:
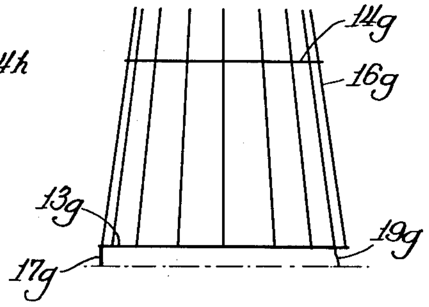

A further variation is shown in Figure 20 wherein it will be noted that the ring **13*f* defining one edge of the slot is of a smaller dimension than the other supporting ring 14*f*. It will also be noted that in this case the ring 14*f* has been shown connected to the outer exterior of the rod 16*f*. This, of course, teaches that the location of the ring 14*f* might be varied dependent upon the characteristics or pattern to be desired. Figure 21 shows that the ring 14*g* is of smaller dimensions than the ring 13*g* which defines one edge of the slot. Here the ring 14*g* has been moved inwardly from the ends of the rod 16*g***.

In Figure 2 it is apparent that the rods 14 are equidistantly spaced about the ring 14. A variation in the number of rods or in their spacing is indicated by the top view shown in Figure 22 wherein the rods **16*h*** are no longer equidistant nor of the same number as suggested by the construction first shown in Figure 2.

Figure 23:
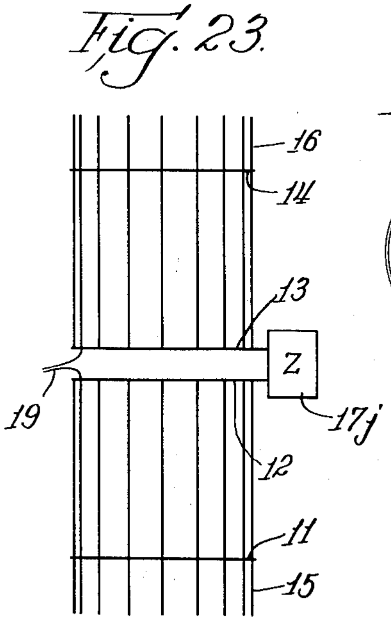
Figure 22:
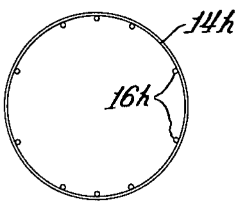

The arrangement illustrated in Figure 23 diagrammatically shows a structure similar to that shown in Figure 1 with the exception that the termination **17*j* has been indicated by a rectangular box bearing the symbol Z to indicate that the termination may comprise an impedance such as a resistor, capacitor or an inductor. For certain operating conditions the impedance Z may be infinite as in the case of an open circuit. Still another arrangement is illustrated in Figures 24 and 25 wherein a plurality of rings 31, 32, 33 and 34 support a plurality of folded elements 35 each arranged along a radius of the circular member 31**. This forms what amounts to two concentric cylinders, one of which is a continuous cylinder while the other or outer cylinder has a slot therein.

Figure 6:
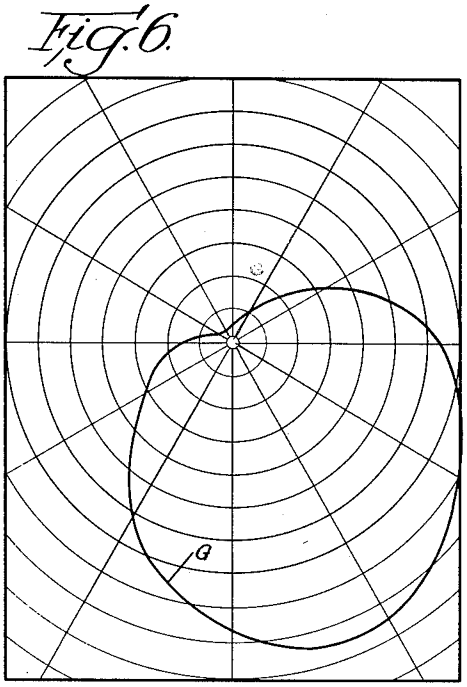
Figure 7:
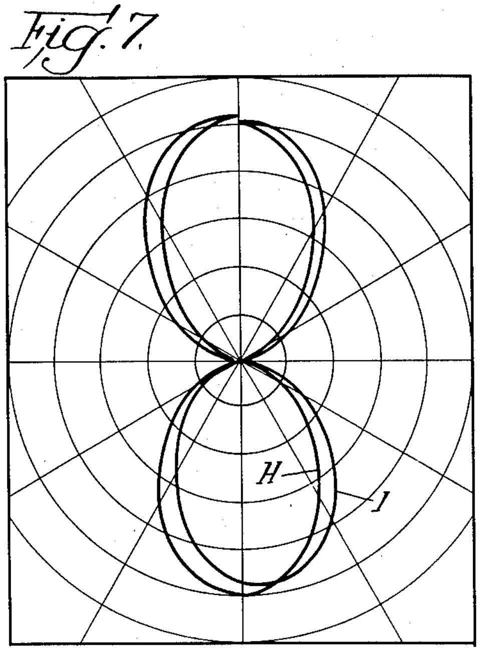
Figures 7, 8, 9 and 10 are graphical representations of the relative power radiated in the E plane at various frequencies as seen perpendicular to the plane of the short circuit connection of the radiating element.
Figure 8:
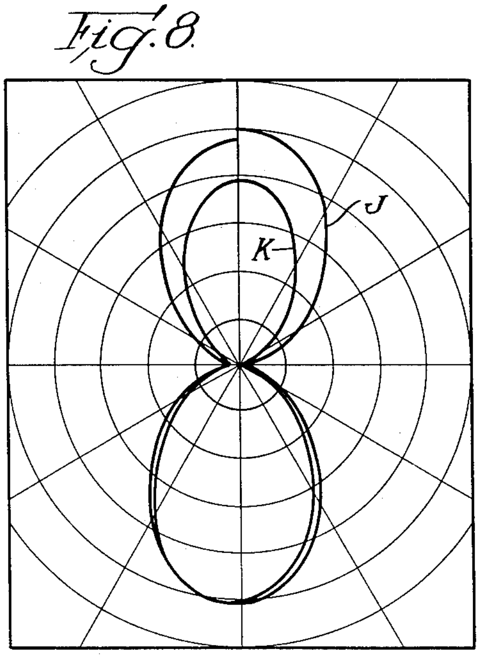
Figure 9:
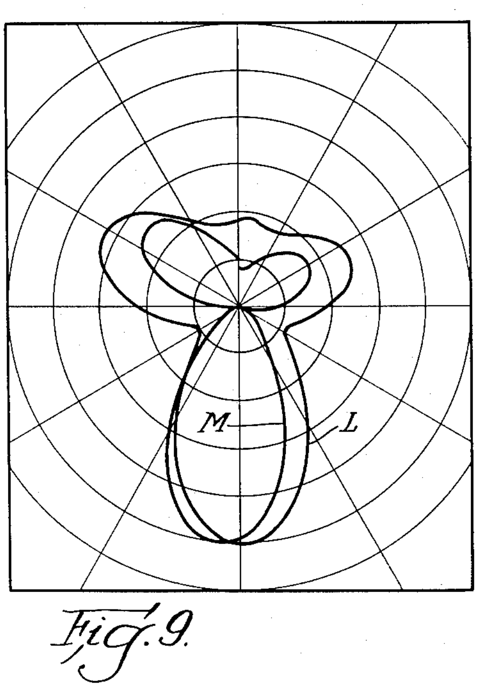
Figure 10:
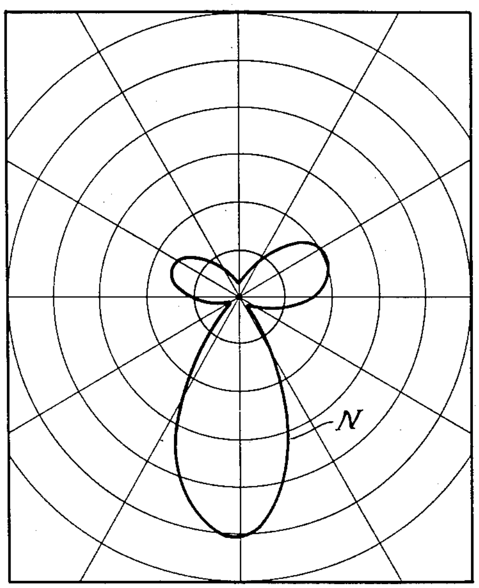
Figure 11:
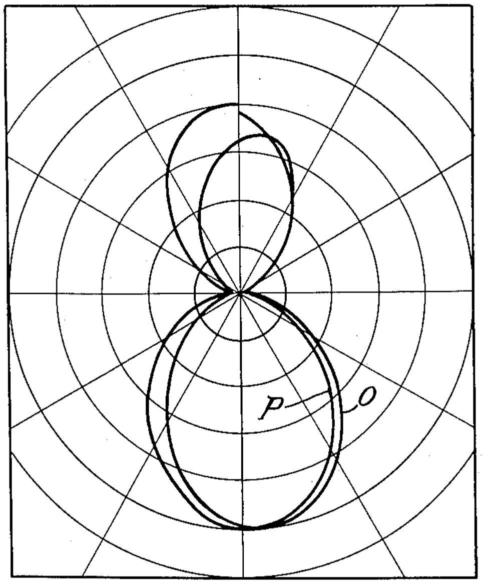
Figures 11, 12, 13 and 14 are graphical representations of the relative power radiated in the E plane at various frequencies as seen in the plane of the short circuit connection to the radiating element.
Figure 12:
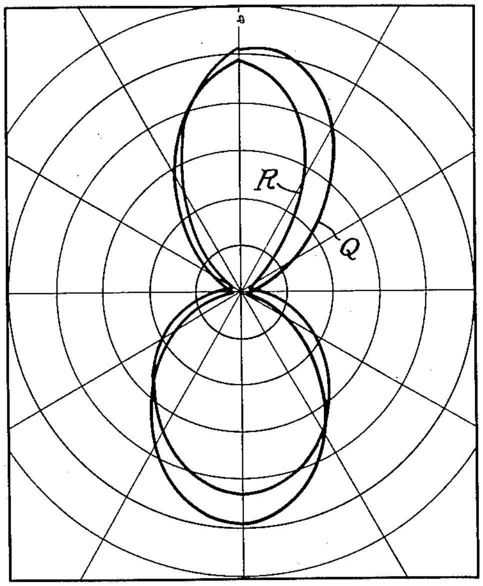
Figure 13:
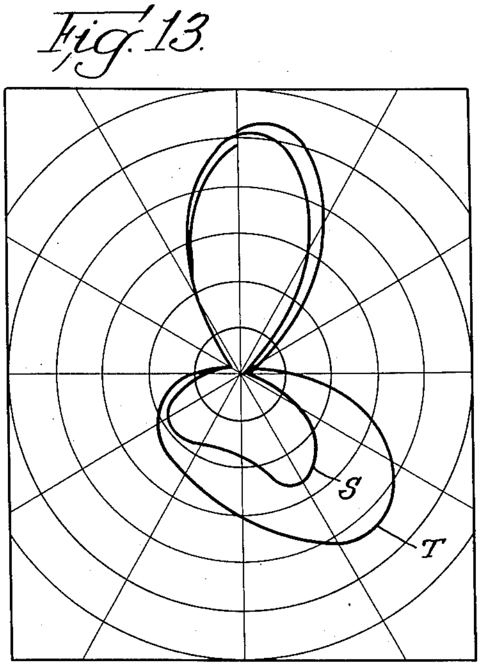
Figure 14:
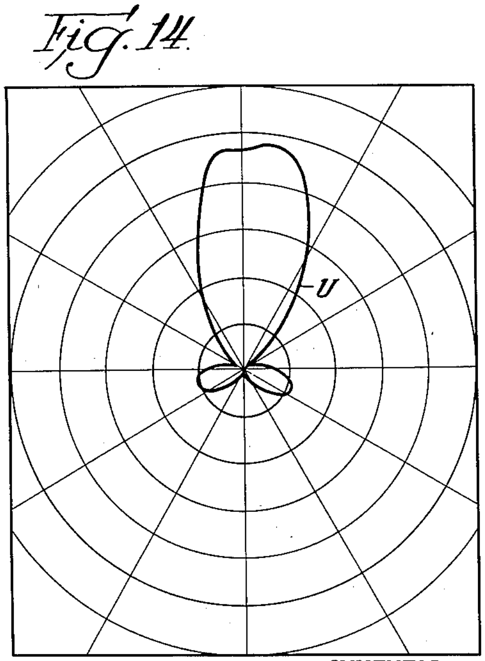

The arrangement illustrated in Figure 26 is an end view of a variation of the structure shown in Figures 1 and 2. If, instead of using circular rings 11, 12, 13, and 14, elliptical rings such as 14K shown in Figure 6 are employed, the radiation pattern will be narrowed along one axis and broadened along another axis perpendicular thereto. The remaining structure would appear similar to the structure shown in Figures 1 and 2, and in fact a side view of an elliptical ring antenna would appear the same as Figure 1. It, of course, is understood that Figure 26 has not shown the details of the support members 20, 21, 22, 23, and 24, although it is apparent to those skilled in the art that similar support members would be provided.

In place of a simple slot a folded slot might be employed which would have the appearance as shown in Figure 27. Here a structure similar to that shown in Figure 1 is provided with a pair of additional rings 36 and 38 in the planes of rings 13 and 12 respectively. These rings 36 and 38 each may be connected by a conductive member 37 to the rings 13 or 12 respectively. In certain embodiments the rings 36 and 38 also may be joined together by another conductive member 39, at a point diametrically opposite the conductive members 37.

A variation of the arrangement shown in Figure 27 is illustrated in Figure 28 where two rings 36 and 38 are replaced by two straight rods 40 and 41 attached directly to the rings 13 and 12. A conductive member 42 may join them in a manner similar to the conductive member 39. This provides an impedance of a different characteristic across the termination point of the rings 12 and 13. The open transmission line provided in this Figure 28 has no appreciable coupling to the remainder of the antenna, whereas the line produced by the two rings 36 and 38 of Figure 27 is coupled to the rings 13 and 12 to form a folded line. Thus it will be appreciated that the impedance appearing across the slot formed by the rings 12 and 13 might be varied by such auxiliary rings as the rings 36 and 38 and the open wire line 40, 41. It previously has been mentioned that the termination points could be placed at some other point than 180° from the feed point, and hence where other terminations except the open circuit termination such as that illustrated diagrammatically in Figure 23 by 17j are employed they could be connected to the rings 12 and 13 at more than one point or a plurality of such elements might be employed at different points along the rings 12 and 13. Likewise the feed line 19 may be connected to several places on the rings 12 and 13 of Figure 1.

Figures 29 and 30 are top and side view of a structure similar to that shown in Figure 1 where each of the end rods 16 is provided with a capacity plate 42. This has the effect of lengthening the rods 16 electrically beyond their physical length. The ends of the rod 16 might be tied together by large capacitive members to produce an end capacity as may be desired.

In suggesting and describing certain variations contemplated by the showing of Figures 15 through 30 it will be appreciated that for different frequencies different solutions might be employed particularly since it was contemplated that the frequency range which the antenna is to cover is more than one octave.

While for the purpose of illustrating and describing the present invention certain preferred embodiments have been shown in the drawings, it is to be understood that the invention is not to be limited thereby since such variations and other embodiments are contemplated as may be commensurate with the spirit and scope of the invention set forth in the accompanying claims.

I claim as my invention:

1. A broad band antenna comprising a defined cylindrical surface divided at its longitudinal center by a slot extending substantially about its circumference, and connections to a transmission line adjacent the longitudinal center of said slot, said cylinder having an axial length substantially equal to its circumference.

2. A broad band antenna comprising a defined cylindrical surface divided at its longitudinal center by a slot extending substantially about its circumference, said cylinder adjacent the ends of said slot being connected to ground, and connections to a transmission line located a short distance from the longitudinal center of said slot, said cylindrical surface having a circumference substantially equal to its axial length.

3. A broad band antenna radiating element comprising a defined cylindrical surface divided at its longitudinal center by a transverse slot extending substantially about its circumference, and connections to a transmission line located a short distance from the longitudinal center of said slot, said cylindrical surface having a circumference substantially equal to its axial length and of the order of one-half wave length of a frequency to be radiated.

4. A broad band antenna radiating element comprising a plurality of rings supporting a plurality of spaced rods to define a cylindrical surface divided at its longitudinal center by a transverse slot extending substantially about its circumference, said cylinder adjacent the ends of said slot being connected together, and connections to a transmission line located a short distance from the longitudinal center of said slot, said cylindrical surface having a circumference substantially equal to its axial length and of the order of one-half wave length of an intermediate frequency in the band of frequencies to be radiated.

5. A transversely slotted cylindrical antenna element comprising two conductive structures each defining similar cylindrical surfaces, said structures having a common axis and each having one end closely positioned adjacent to the other structure, said ends being connected together by a single grounded conductive member, and means for connecting said ends at a point asymmetrically remote from said conductive member to a transmission line.

6. A transversely slotted cylindrical antenna element comprising two conductive structures each defining similar cylindrical surfaces, said structures having a common axis and each having one end closely positioned adjacent the other structure, each surface having a length of the order of one-half its circumference, said ends being connected together by a single conductive member, and means for connecting said ends at a point displaced from a point directly opposite said conductive member to a transmission line.

7. A transversely slotted cylindrical antenna element comprising two conductive structures each defining similar cylindrical surfaces, said structures having a common axis with one end closely positioned adjacent the other structure, said ends being connected together by a single conductive member, each surface having a length of the order of one-half of its circumference, and means for connecting said ends to a transmission line at a point displaced of the order of 15° from a point diametrically opposite said conductive member.

8. A broad band antenna comprising a defined curvilinear surface of generally cylindrical shape having at its center a slot extending substantially about its circumference, the axial length of said surface being substantially equal to its circumference, and connections to a transmission feed line along said slot.

References Cited in the file of this patent

UNITED STATES PATENTS

| | | |
|---|---|---|
| 2,533,900 | Shanklin | Dec. 12, 1950 |
| 2,611,865 | Alford | Sept. 23, 1952 |